(12) United States Patent
Sun et al.

(10) Patent No.: US 12,260,057 B2
(45) Date of Patent: Mar. 25, 2025

(54) TOUCH SUBSTRATE AND TOUCH DISPLAY PANEL

(71) Applicant: BOE Technology Group Co., Ltd., Beijing (CN)

(72) Inventors: Xuefei Sun, Beijing (CN); Xinxing Wang, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/780,646

(22) PCT Filed: Jul. 2, 2021

(86) PCT No.: PCT/CN2021/104210
§ 371 (c)(1),
(2) Date: May 27, 2022

(87) PCT Pub. No.: WO2023/272713
PCT Pub. Date: Jan. 5, 2023

(65) Prior Publication Data
US 2024/0160326 A1    May 16, 2024

(51) Int. Cl.
*G06F 3/044* (2006.01)
(52) U.S. Cl.
CPC .......... *G06F 3/0448* (2019.05); *G06F 3/0445* (2019.05); *G06F 2203/04111* (2013.01); *G06F 2203/04112* (2013.01)

(58) Field of Classification Search
CPC ................ G06F 3/0448; G06F 3/0445; G06F 2203/04111; G06F 2203/04112; G06F 3/041
See application file for complete search history.

(56) References Cited

U.S. PATENT DOCUMENTS

2016/0209967 A1    7/2016 Ku
2017/0156218 A1*   6/2017 Kogawa ............... H05K 3/1275
(Continued)

FOREIGN PATENT DOCUMENTS

CN    106155448 A    11/2016
CN    109947289 A    6/2019
(Continued)

*Primary Examiner* — Patrick N Edouard
*Assistant Examiner* — Joseph P Fox
(74) *Attorney, Agent, or Firm* — Nath, Goldberg & Meyer; Joshua B. Goldberg

(57) ABSTRACT

The present disclosure provides a touch substrate and a touch display panel. The touch substrate includes: a base substrate including a first and second surfaces opposite to each other; a first metal mesh layer disposed on the first surface of the base substrate, the first metal mesh layer including a plurality of first metal mesh strips arranged successively along a first direction, every two adjacent first metal mesh strips being independent from each other, each first metal mesh strip extending along a second direction orthogonal to the first direction and including metal mesh lines, the metal mesh lines including a plurality of trunk portions extending along the second direction and a plurality of branch portions respectively connected to the plurality of trunk portions, extending from the plurality of trunk portions along a direction at a predetermined angle to the second direction.

20 Claims, 10 Drawing Sheets

(56) References Cited

U.S. PATENT DOCUMENTS

| | | |
|---|---|---|
| 2020/0042116 A1 | 2/2020 | Li |
| 2020/0183538 A1* | 6/2020 | Li .................... G06F 3/0448 |
| 2021/0064209 A1 | 3/2021 | Zhang et al. |

FOREIGN PATENT DOCUMENTS

| | | |
|---|---|---|
| CN | 110442259 A | 11/2019 |
| CN | 111506226 A | 8/2020 |
| CN | 111722762 A | 9/2020 |
| CN | 111736726 A | 10/2020 |
| CN | 111831172 A | 10/2020 |
| CN | 112328116 A | 2/2021 |

* cited by examiner a (wiring on first surface 200)

b (wiring on second surface 300)

c (combination of orthographic projections of wiring on first surface 200 and wiring on second surface 300 on substrate base 1)

TOUCH SUBSTRATE AND TOUCH DISPLAY PANEL

This is a National Phase Application filed under 35 U.S.C. 371 as a national stage of PCT/CN2021/104210, filed Jul. 2, 2021, the content of which is hereby incorporated by reference in its entirety.

TECHNICAL FIELD

The present disclosure relates to the field of display technology, and particularly, to a touch substrate and a touch display panel.

BACKGROUND

With the rapid development of active matrix organic light-emitting diode (AMOLED) technology, the development of touch display devices enters an era of full screen and thin bezel. In order to deliver better user experience, flexible, wearable and foldable touch display devices with full screens, thin bezels and high resolution will definitely become the major development trend of AMOLED technology in the future.

SUMMARY

The present disclosure provides a touch substrate and a touch display panel.

The touch substrate includes: a base substrate including a first surface and a second surface opposite to each other; a first metal mesh layer disposed on the first surface of the base substrate, the first metal mesh layer including a plurality of first metal mesh strips arranged successively along a first direction, every two adjacent first metal mesh strips being independent from each other, each first metal mesh strip extending along a second direction orthogonal to the first direction and including a plurality of metal mesh lines, the plurality of metal mesh lines arranged in a mesh shape and including a plurality of trunk portions extending along the second direction and a plurality of branch portions respectively connected to the plurality of trunk portions, extending from the plurality of trunk portions along directions at predetermined angles to the second direction, the plurality of trunk portions of the plurality of metal mesh lines of the first metal mesh strip being provided with at least one opening along the second direction, such that the first metal mesh strip includes at least one opening along the second direction; and a second metal mesh layer disposed on the second surface of the base substrate, the second metal mesh layer including a plurality of metal connection structures, each of which includes a first end, a second end and a metal connection line between the first end and the second end, wherein an orthographic projection of the metal connection line on the base substrate at least partially overlaps with an orthographic projection of a corresponding opening of the at least one opening on the base substrate, and the first end and the second end are electrically connected to corresponding metal mesh lines of the first metal mesh strip through vias disposed in the base substrate.

In one embodiment, at least one of two ends of the at least one opening of the plurality of metal mesh lines includes two adjacent branch portions disconnected from each other, and one of the first end and the second end of the metal connection structure connects the two adjacent branch portions disconnected from each other through one of the vias disposed in the base substrate.

In one embodiment, the metal connection line of the metal connection structure extends along the second direction.

In one embodiment, a redundant metal line is further disposed on the first surface and at a position corresponding to the metal connection line of at least one metal connection structure; and the redundant metal line is in a floating state, and is situated on a same layer and made of a same material as the first metal mesh strip.

In one embodiment, the second metal mesh layer further includes a plurality of second metal strips extending along the second direction; and the plurality of second metal strips are arranged successively along the first direction.

In one embodiment, respective orthographic projections of two adjacent second metal strips of the plurality of second metal strips on the base substrate overlap with an outer contour of an orthographic projection of a corresponding first metal mesh strip of the plurality of first metal mesh strips on the substrate base.

In one embodiment, the metal connection structure further includes a first end connection line connected to the first end and a second end connection line connected to the second end; the first end connection line is connected to a second metal strip adjacent to the first end connection line, and an intersection between the first end connection line and the second metal strip is a first connection point on the second metal strip; the second end connection line is connected to a second metal strip adjacent to the second end connection line, and an intersection between the second end connection line and the second metal strip is a second connection point on the second metal strip; and the second metal strip further includes a first gap disposed on a side of the first connection point and a second gap disposed on a side of the second connection point same as the side of the first connection point.

In one embodiment, respective orthographic projections of the plurality of branch portions of the plurality of metal mesh lines in the first metal mesh layer on the base substrate at least partially overlap with respective orthographic projections of the first end connection line and the second end connection line on the base substrate.

In one embodiment, an aggregation of respective orthographic projections of the plurality of first metal mesh strips and the plurality of second metal strips on the base substrate includes a plurality of first metal mesh sub-strips, a plurality of second metal mesh sub-strips and a plurality of third metal mesh sub-strips so as to constitute a plurality of repeating units, each repeating unit includes a first metal mesh sub-strip, a second metal mesh sub-strip and a third metal mesh sub-strip, and the plurality of repeating units are arranged successively along the first direction; each repeating unit includes a plurality of repeating sub-units arranged along the second direction, each repeating sub-unit includes a structure of four rows and three columns constituted by four first blocks, four second blocks and four third blocks, a first row includes a first block, a second block and a third block arranged successively along the first direction, each of a second row and a fourth row includes a second block, a third block and a first block arranged successively along the first direction, and a third row includes a third block, a first block and a second block arranged successively along the first direction; the first block includes a first sub-block and a second sub-block arranged along the first direction and being in contact with each other, the second block includes a third sub-block and a first sub-block arranged along the first direction and being in contact with each other, and the third block includes a second sub-block and a third sub-block arranged along the first direction and being in contact with each other; and a position at which the first sub-block and the second sub-block of the first block in each of the first to third rows contact with each other overlaps with an orthographic protection of a corresponding metal connection structure of the plurality of metal connection structures on the base substrate.

In one embodiment, respective orthographic projections of the plurality of metal connection structures on the base substrate fall within respective structures in the first row, the second row and the third row.

In one embodiment, each of the first sub-block, the second sub-block and the third sub-block is a hexagon extending along the second direction; a length of the first sub-block along the second direction is greater than a length of each of the second sub-block and the third sub-block along the second direction; and the first block and the second block belonging to two adjacent rows respectively are offset by a predetermined distance along the first direction such that the third sub-block of the second block is between the first sub-block and the second sub-block of the first block along the first direction, the second block and the third block belonging to two adjacent rows respectively are offset by a predetermined distance along the first direction such that the second sub-block of the second block is between the third sub-block and the first sub-block of the third block along the first direction, and the first block and the third block belonging to two adjacent rows respectively are offset by a predetermined distance along the first direction such that the second sub-block of the third block is between the first sub-block and the second sub-block of the first block along the first direction.

In one embodiment, an aggregation of respective orthographic projections of the plurality of first metal mesh strips and the plurality of second metal strips on the base substrate includes a plurality of first metal mesh sub-strips, a plurality of second metal mesh sub-strips and a plurality of third metal mesh sub-strips so as to constitute a plurality of repeating units, each repeating unit includes a first metal mesh sub-strip, a second metal mesh sub-strip and a third metal mesh sub-strip, and the plurality of repeating units are arranged successively along the first direction; each repeating unit includes a plurality of repeating sub-units arranged along the second direction, each repeating sub-unit includes a structure of three rows and three columns constituted by three first blocks, three second blocks and three third blocks, a first row includes a first block, a second block and a third block arranged successively along the first direction, a second row includes a second block, a third block and a first block arranged successively along the first direction, and a third row includes a third block, a first block and a second block arranged successively along the first direction; the first block includes a first sub-block and a second sub-block arranged along the first direction and being in contact with each other, the second block includes a third sub-block and a first sub-block arranged along the first direction and being in contact with each other, and the third block includes a second sub-block and a third sub-block arranged along the first direction and being in contact with each other; and a position at which the first sub-block and the second sub-block of the first block in each of the first to third rows contact with each other overlaps with an orthographic protection of a corresponding metal connection structure of the plurality of metal connection structures on the base substrate.

In one embodiment, the first block and the second block belonging to two adjacent rows respectively are aligned with each other along the first direction, the second block and the third block belonging to two adjacent rows respectively are aligned with each other along the first direction, and the first block and the third block belonging to two adjacent rows respectively are aligned with each other along the first direction.

In one embodiment, each second metal strip includes a plurality of first connection points and a plurality of second connection points which are arranged alternately, and an opening is disposed between every first connection point and second connection point adjacent to each other.

In one embodiment, at a position of the first sub-block, the first metal mesh strip includes an additional metal line being in contact with and connected to a metal mesh line extending along the second direction, among the plurality of metal mesh lines, and the additional metal line extends along the first direction.

The present disclosure further provides a touch display panel, including a display substrate and the touch substrate as described above.

In one embodiment, the display substrate includes a plurality of pixel units, each of which includes a first sub-pixel, a second sub-pixel and a third sub-pixel; and an orthographic projection of the first sub-block on the base substrate encompasses an orthographic projection of the first sub-pixel on the base substrate, an orthographic projection of the second sub-block on the base substrate encompasses an orthographic projection of the second sub-pixel on the base substrate, and an orthographic projection of the third sub-block on the base substrate encompasses an orthographic projection of the third sub-pixel on the base substrate.

In one embodiment, at a position of the first sub-block, the first metal mesh strip includes an additional metal line being in contact with and connected to a metal mesh line extending along the second direction, among the plurality of metal mesh lines, and the additional metal line extends along the first direction and divides the first sub-block into a first portion and a second portion; the display substrate includes a plurality of pixel units, each of which includes two first sub-pixels, a second sub-pixel and a third sub-pixel; and an orthographic projection of the first portion on the base substrate encompasses an orthographic projection of one of the two first sub-pixels on the base substrate, an orthographic projection of the second portion on the base substrate encompasses an orthographic projection of the other of the two first sub-pixels on the base substrate, an orthographic projection of the second sub-block on the base substrate encompasses an orthographic projection of the second sub-pixel on the base substrate, and an orthographic projection of the third sub-block on the base substrate encompasses an orthographic projection of the third sub-pixel on base substrate.

In one embodiment, the first sub-pixel includes a green sub-pixel, the second sub-pixel includes a red sub-pixel and the third sub-pixel includes a blue sub-pixel.

BRIEF DESCRIPTION OF THE DRAWINGS

In order to make various embodiments of the present disclosure be clear, a brief description will be hereinafter given to the drawings relating to these embodiments. Apparently, the drawings to be described below only illustrate some embodiments of the present disclosure, and the present disclosure is not limited thereto.

DETAILED DESCRIPTION OF THE EXEMPLARY EMBODIMENTS

Figure 1A:
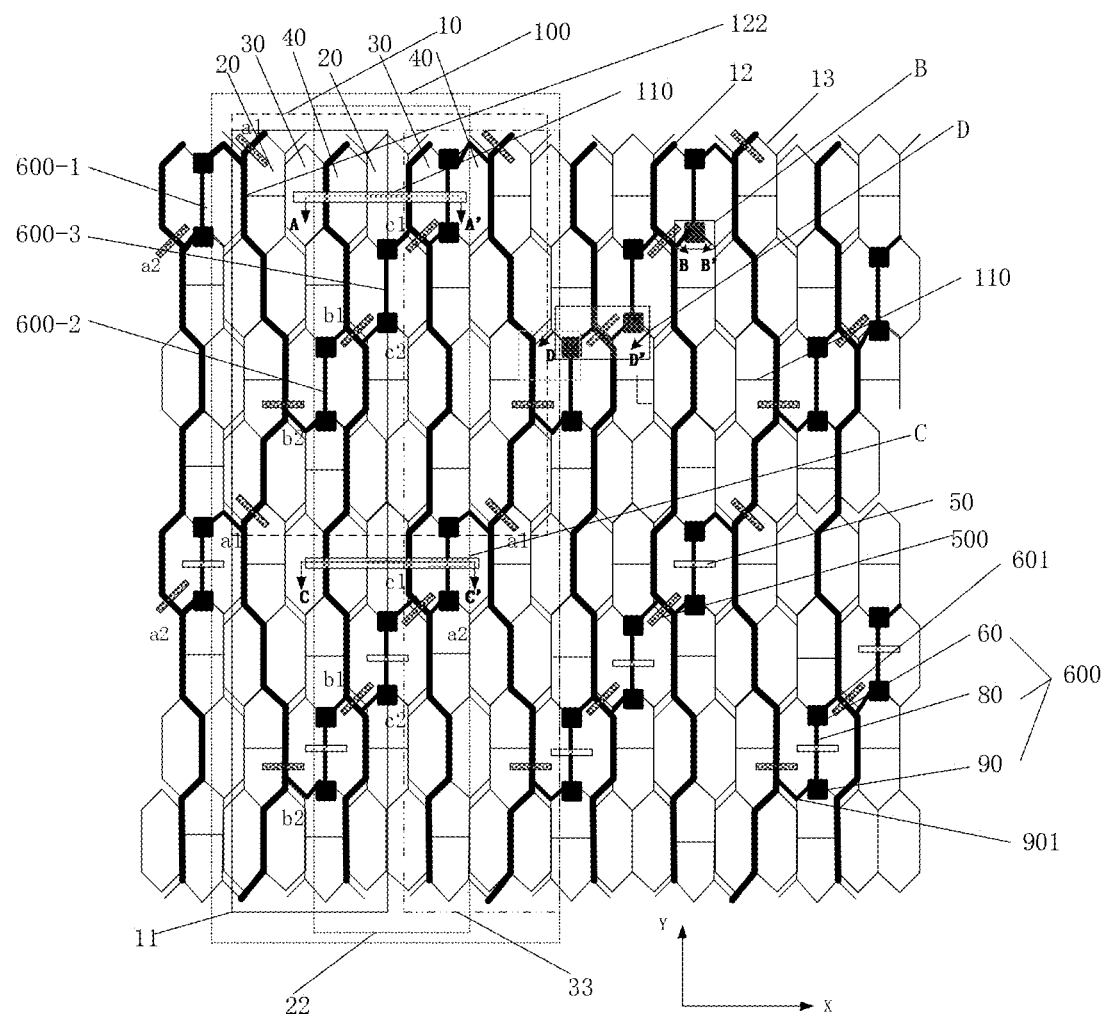
FIG. 1A shows a top view of a touch substrate according to some embodiments of the present disclosure.

In order to enable a person skilled in the art to have better understanding of the technical solutions of the present disclosure, a detailed description will hereinafter be given to the present disclosure with reference to the accompanying drawings and embodiments.

Unless otherwise defined, all the technical terms or scientific terms used herein have the same meanings as commonly understood by a person skilled in the art to which the present disclosure belongs. The terms "first," "second" and the like, which are used in the present disclosure, are not intended to indicate any sequence, amount or importance, but distinguish one element from another. Also, the terms "one" "an/a", "the" and the like, are not intended to limit the amount, but indicate the existence of at least one. The terms "comprises" "comprising" "includes" "including" and the like, are intended to specify that the elements or the objects stated before these terms encompass the elements or the objects and equivalents thereof listed after these terms, but do not preclude the other elements or objects. The terms "connect", "connected" and the like, are not intended to define a physical connection or mechanical connection, but may include an electrical connection, directly or indirectly. The terms "upper", "down", "left", "right" and like, are only used to indicate the relative positional relationship, and when the absolute position of the object to be described is changed, the relative positional relationship may also change accordingly. In addition, "same layer" mentioned in various embodiments of the present application may refer to a same layer structure formed by a film layer; or, for example, the same layer structure may be a layer structure which is formed by one patterning process via a same mask after forming a film layer for forming specific patterns by a same film forming process. According to different specific patterns, one patterning process may include a plurality of exposure, development or etching processes, and the specific patterns in formed layer structures may be continuous or discontinuous. These specific patterns may be at different heights or have different thicknesses.

Due to their advantages such as small thicknesses, thin bezels and better optical display effects, touch display panels adopting self-capacitive flexible multi-layer-on-cell (FM-LOC) structures are gradually becoming the mainstream of AMOLED screens for mobile phones on the market. However, a particular self-capacitive FMLOC structure at least includes a first touch metal layer and a second touch metal layer, which are situated in different film layers, for example, the second touch metal layer is closer to a surface of a touch display panel than the first touch metal layer, which will result in a difference in reflectance of the touch display panel viewed from the outside when the self-capacitive FMLOC structure is integrated with a display substrate (e.g., organic light-emitting diode (OLED) display substrate). Besides, in order to form a plurality of touch blocks (that is, a plurality of touch units) of a touch substrate, which are independent from one another, it is necessary to cut off metal wires of the second touch metal layer at positions corresponding to spaces between the touch blocks to be formed, and the cut-off metal wires in the second touch metal layer proximal to a surface of the touch substrate will cause more apparent visible mura (i.e., unevenness).

In order to solve this problem, the present disclosure provides a touch substrate, which includes a base substrate having a first surface and a second surface opposite to each other; a first metal mesh layer disposed on the first surface of the base substrate and including a plurality of first metal mesh strips arranged successively along a first direction and being independent from one another, each first metal mesh strip extending a second direction orthogonal to the first direction and including a plurality of first metal mesh lines, the plurality of first metal mesh lines arranged in a mesh shape and including a plurality of trunk portions extending along the second direction and a plurality of branch portions respectively connected to the plurality of trunk portions and extending from the plurality of trunk portions along a direction at a predetermined angle to the second direction, and the plurality of first metal mesh lines of the first metal mesh strip being provided with at least one opening along the second direction such that the first metal mesh strip at least includes at least one opening along the second direction; and a second metal mesh layer disposed on the second surface of the base substrate and including a plurality of metal connection structures, each of which includes a first end, a second end and a metal connection line between the first end and the second end, wherein an orthographic projection of the metal connection line between the first end and the second end of each of the plurality of metal connection structures on the base substrate at least partially overlaps with an orthographic projection of at least one opening of the plurality of trunk portions in the plurality of first metal mesh lines of a corresponding first metal mesh strip among the plurality of first metal mesh strips on the base substrate, and each of the first end and the second end of the metal connection structure is electrically connected to corresponding metal mesh lines of the first metal mesh strip through a via disposed in the base substrate so as to connect these first metal mesh lines at two ends of the at least one opening in the plurality of first metal mesh lines. In other words, in the present disclosure, the metal connection structure disposed on the second surface of the base substrate connects disconnected trunk portions extending along the second direction in the corresponding first metal mesh strip on the first surface such that the first metal mesh lines extending along the second direction in the first metal mesh strip are connected to one another.

Further, at least one of two ends of the at least one opening in the plurality of first metal mesh lines includes two adjacent branch portions disconnected from each other, and one of the first end and the second end of the metal connection structure connects the two adjacent branch portions disconnected from each other through a via disposed in the base substrate. In other words, in the present disclosure, the metal connection structure disposed on the second surface of the base substrate connects disconnected branch portions extending along the direction at the predetermined angle to the second direction in the corresponding first metal mesh strip on the first surface such that the first metal mesh lines in the entire first metal mesh strip are all connected to one another, which can increase the number of metal gird lines used to form the touch blocks as well as resistor-capacitor (RC) load and hence improve touch sensitivity.

In the touch substrate of the present disclosure, a metal mesh forming the touch blocks include the first metal mesh layer and the second metal mesh layer on the first surface and the second surface of the base substrate, respectively, and first wiring of the first metal mesh layer and second wiring of the second metal mesh layer are combined to form the metal mesh whose mesh lines are connected to one another, thereby making it easy to divide the metal mesh according to actual needs to form the plurality of touch blocks as needed.

Specifically, in one embodiment, as shown in FIGS. 1A to 5, the touch substrate of the present disclosure includes: a base substrate 1; and a first metal mesh layer TM2 and a second metal mesh layer TM1 disposed on a first surface 200 and a second surface 300 of the base substrate 1, respectively. As shown in FIGS. 1A and 1B, the first metal mesh layer TM2 formed on the first surface 200 includes a plurality of metal mesh lines 13 denoted by thinner lines and a plurality of additional metal lines 110, wherein some of the plurality of metal mesh lines 13 are connected to one another such that the plurality of metal mesh lines as a whole are arranged in a mesh shape; the plurality of additional metal lines 110 extend along a first direction X, are electrically connected to the plurality of metal mesh lines 13, and form parts of touch units for detecting touch together with the plurality of metal mesh lines 13. However, the present disclosure is not limited thereto, and the first metal mesh layer TM2 may only include the plurality of metal mesh lines 13, rather than the plurality of additional metal lines 110, which depends on the arrangement of a sub-pixel array in a corresponding display substrate. The second metal mesh layer formed on the second surface 300 includes a plurality of second metal strips 12 denoted by thicker lines and a plurality of metal connection structures 600; the plurality of second metal strips 12 extend along a second direction Y orthogonal to the first direction X and may be arranged successively along the first direction X, for example, they may be evenly arranged at substantially equal intervals; and each metal connection structure includes a first end 60, a second end 90 and a metal connection line 80 there-between. As shown in FIGS. 1A and 1B, the metal connection structures 600 are disposed on the second metal mesh layer TM1, and the metal connection lines 80 thereof may extend along the second direction Y.

As shown in FIG. 1A, the thinner lines and the thicker lines denote the first metal mesh layer TM2 and the second metal mesh layer TM1 formed on different surfaces of the base substrate, respectively. In other words, in the present disclosure, the first metal mesh layer TM2 and the second metal mesh layer TM1 are arranged in different layers. The thinner lines and the thicker lines shown in FIG. 1A are merely used to distinguish between the first metal mesh layer TM2 and the second metal mesh layer TM1, but do not represent actual widths of respective metal lines in the two layers. For example, the widths of the metal lines in the first metal mesh layer TM2 and the second metal mesh layer TM1 may range from 2 μm to 10 μm, for example, from 3 μm to 5 μm.

Figure 1B:
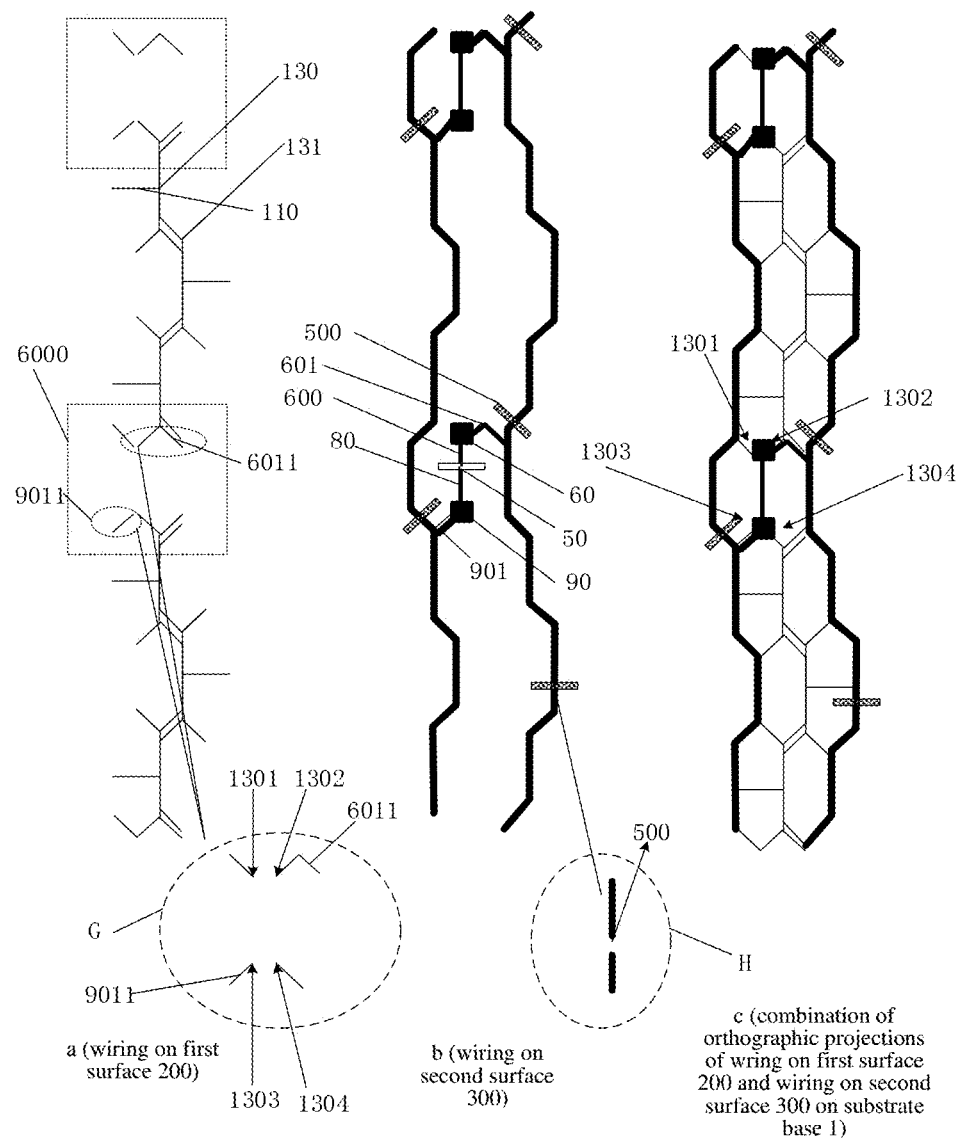
FIG. 1B shows a schematic view of wiring of a repeating unit constituted by a first metal mesh layer and a second metal mesh layer respectively disposed on a first surface and a second surface of a base substrate of a touch substrate according to some embodiments of the present disclosure.
Figure 2:
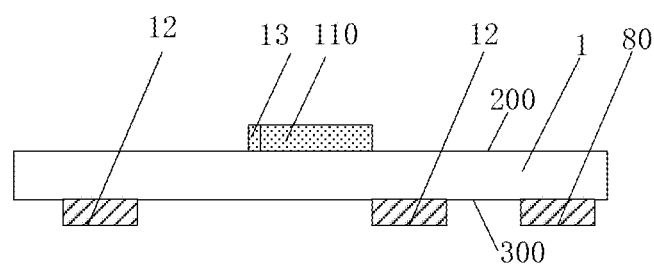
FIG. 2 shows a cross-sectional view of the touch substrate according to the embodiments shown in FIG. 1A taken along a line AA'.

FIG. 2 shows a cross-sectional view of the touch substrate of FIG. 1A taken along a line AA'. In FIG. 2, the additional metal line 110 is schematically drawn as a thicker line in order to clearly show the cross section of the wiring of touch mesh lines taken along the line AA'. As shown in FIG. 2, the metal mesh line 13 and the additional metal line 110 in contact with each other are formed on the first surface 200 of the base substrate 1, that is, the additional metal line 110 is a part of the metal mesh line on the first surface 200; and the second metal strips 12 and the metal connection line 80 between the first end 60 and the second end 90 of the metal connection structure 600 are formed on the second surface 300 of the base substrate 1. As shown in FIG. 2, on the first surface 200, the metal mesh line 13 of the first metal mesh layer TM2 is not disposed at an edge of the additional metal line 110 proximal to one of the second metal strips 12, and the second metal strip 12 is disposed on the second surface 300; an orthographic projection of the additional metal line 110 on the base substrate 1 adjoins an orthographic projection of the second metal strip 12 on the base substrate 1; therefore, as can be seen from a composite view of respective orthographic projections of the first metal mesh layer TM2 and the second metal mesh layer TM1 on the base substrate 1 shown in FIGS. 1A and 1B, the additional metal line 110 adjoins the second metal strip 12 along the line AA. However, the present disclosure is not limited thereto, and the orthographic projection, on the base substrate 1, of the additional metal line 110 on the first surface 200 may not adjoin the orthographic projection, on the base substrate 1, of the second metal strip 12 on the second surface 300; instead, they may be spaced apart from each other. In the present disclosure, in a composite view of respective orthographic projections of the first metal mesh layer TM2 and the second metal mesh layer TM1 on the base substrate 1 shown in FIGS. 1A and 1B, the metal mesh line 13 defined between two second metal strips 12 may be deemed as "a first metal mesh strip disposed on the first surface 200 of the base substrate 1". Therefore, a plurality of first metal mesh strips are disposed on the entire first surface 200 of the base substrate 1, they are independent from one another, and a gap between respective orthographic projections, on the base substrate 1, of every two adjacent first metal mesh strips is filled by the orthographic projection, on the base substrate 1, of the second metal strip 12 on the second surface 300 and at a position corresponding to the gap. In addition, as shown in FIG. 2, on the first surface 200, no metal mesh line 13 is disposed at a position corresponding to the metal connection line 80 of the metal connection structure 600, that is, the metal mesh lines 13 are disconnected from each other at the position corresponding to the metal connection line 80 on the first surface 300.

Specifically, Sub-figure a of FIG. 1B shows a schematic view of the wiring of a first metal mesh strip in FIG. 1A. A plurality of metal mesh lines 13 of the first metal mesh strip on the first surface 200 may include a plurality of trunk portions 130 and a plurality of branch portions 131; the plurality of trunk portions 130 extend along the second direction, and the plurality of branch portions 131 include a plurality of branch portions 131 extending from the plurality of trunk portions 130 at a predetermined angle to the second direction; the plurality of metal mesh lines 13 of the first metal mesh strip is provided with at least one opening unit 6000 along the second direction such that the first metal mesh strip includes at least one longitudinal opening along the second direction, and the first metal mesh strip thus formed is broken along the second direction, as shown in one opening unit 6000 denoted by a dotted line G in Sub-figure a of FIG. 1B. Sub-figure b of FIG. 1B shows a schematic view of the wiring on the second surface 300 in FIGS. 1A and 1B, and the portion shown in Sub-figure b corresponds to the first metal mesh strip shown in Sub-figure a; this portion includes two second metal mesh strips 12 and metal connection structures 600 there-between; each metal connection structure 600 includes a first end 60, a second end 90 and a metal connection line 80 there-between; the metal connection structure 600 further includes a first end connection line 601 connecting the first end 60 to one second metal strip 12 adjacent thereto and a second end connection line 901 connecting the second end 90 to the other second metal strip 12 adjacent thereto; in addition, each second metal strip 12 is provided with at least one opening 500, as shown in an area enclosed by a dotted line H in Sub-figure b of FIG. 1B; therefore, each second metal strip 12 includes at least one opening, that is, each second metal strip 12 includes a plurality of metal line sections extending along the second direction Y; and every two metal line sections adjacent to each another along the first direction X are connected together by the metal connection structure 600 so as to form the metal mesh on the second surface 300. Sub-figure c of FIG. 1B shows a composite view of respective orthographic projections, on the base substrate 1, of the wiring on the first surface 200 and the wiring on the second surface 300. In addition, as shown in Sub-figure a of FIG. 1B, the plurality of branch portions 131 in the plurality of metal mesh lines of the first metal mesh strip further include at least one disconnected branch portion, and the disconnected branch portion is spaced apart, that is, independent, from the other branch portions of the plurality of branch portions. For example, as shown in Sub-figure a of FIG. 1B, an end 1301 and an end 1302 is disconnected from each other, which indicates that two adjacent branch portions 131 corresponding thereto are disconnected from each other. Similarly, for example, as shown in Sub-figure a of FIG. 1B, an end 1303 and an end 1304 are disconnected from each other, which indicates 1o that two adjacent branch portions 131 corresponding thereto are disconnected from each other. As can be seen from Sub-figure a of FIG. 1B, in each first metal mesh strip formed on the first surface 200, not all metal mesh lines are connected, and there is at least one opening in at least one trunk portion 130 extending along the second direction Y.

Figure 3:
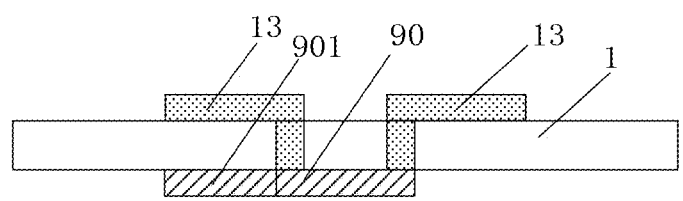
FIG. 3 shows a cross-sectional view of the touch substrate according to the embodiments shown in FIG. 1A taken along a line BB'.

FIG. 3 shows a cross-sectional view of the touch substrate at a position B in FIG. 1A taken along a line BB'. As can be seen from FIG. 3, the metal mesh lines 13 are formed on the first surface 200 of the base substrate 1, and the metal mesh lines 13 on the first surface 200 are disconnected from each other at the position B; the metal connection structure 600 is formed on the second surface 300 of the base substrate 1, the second end 90 thereof connects the metal mesh lines 13 on the first surface 200, which are disconnected from each other at the position B, through vias penetrating through the base substrate 1 and a metal material in the vias. As shown in FIG. 3, the width of the second end 90 of the metal connection structure is 5 μm to 7 μm.

Figure 4:
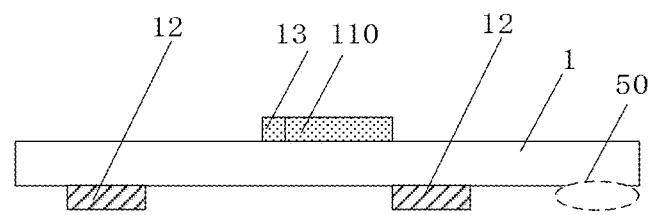
FIG. 4 shows a cross-sectional view of the touch substrate according to the embodiments shown in FIG. 1A taken along a line CC'.

FIG. 4 shows a cross-sectional view of the touch substrate at a position C in FIG. 1A taken along a line CC'. As can be seen from FIG. 4, the metal mesh line 13 and the additional metal line 110 are formed on the first surface 200 of the base substrate 1; the second metal strips 12 are formed on the second surface 300 of the base substrate 1. FIG. 4 differs from FIG. 2 merely in that a portion of the metal connection line 80 at the position C is removed to form an opening 50 shown in FIG. 1A, and accordingly, the metal connection line 80 is broken at the position C shown in FIG. 4.

As described above, both the first end 60 and the second end 90 of the metal connection structure 600 in the second metal mesh layer TM1 may be connected to the metal mesh lines 13 in the first metal mesh layer TM2 through the vias penetrating through the base substrate 1, whereby the metal mesh lines 13 in the first metal mesh strip disconnected at the first end 60 and the second end 90 may be electrically connected to one another; therefore, the metal connection structure 600 formed on the second surface 300 is used to connect the metal mesh lines 13 in the first metal mesh strip on the first surface 200 together, so as to form mesh-shaped metal lines on the two surfaces of the base substrate 1 as parts of the touch units.

As can be seen from FIGS. 1A and 1B, on the second surface 300 of the base substrate 1, the metal connection line 80 of each metal connection structure 600 is configured to extend along the second direction Y and be situated between two adjacent second metal strips 12. Each metal connection structure 600 on the second surface 300 further includes the first end connection line 601 electrically connected to the first end 60 and the second end connection line 901 electrically connected to the second end 90, the first end connection line 601 is connected to a second metal strip 12 adjacent thereto at a first connection point a1, and the second end connection line 901 is connected to a second metal strip 12 adjacent thereto at a second connection point a2. The plurality of second metal strips 12 on the second surface 300 may be connected to one another along the first direction X through the first end connection lines 601 and the second end connection lines 901, that is, the first end connection lines 601 and the second end connection lines 901, which are connection lines along the first direction X, connect the plurality of second metal strips 12 substantially extending along the second direction Y, thereby forming the second metal mesh layer TM1 on the second surface 300. In other words, on the second surface 300, the second metal mesh layer TM1 not only includes the plurality of second metal strips 12 substantially extending along the second direction Y and the plurality of metal connection structures 600 substantially extending along the second direction Y, but also includes the first end connection line 601 and the second end connection line 901 substantially extending along the first direction X for each metal connection structure 600.

Figure 5:
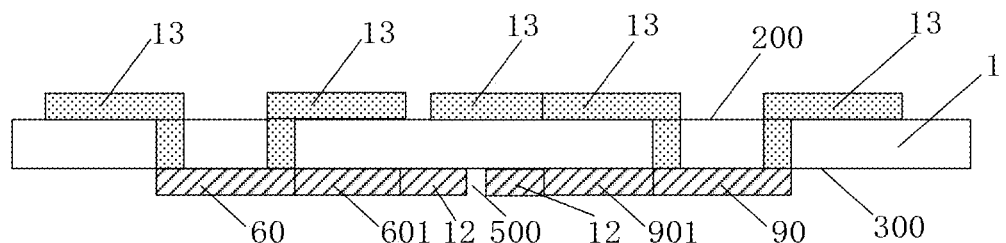
FIG. 5 shows a cross-sectional view of the touch substrate according to the embodiments shown in FIG. 1A taken along a line DD'.

Further, FIG. 5 shows a cross-sectional view of the touch substrate at a position D in FIG. 1A. As can be seen from FIG. 5, at the position D, the metal mesh lines 13 are formed on the first surface 200 of the base substrate 1; at the second end 90, disconnected metal mesh lines 13 on the first surface 200 are connected to each other through the metal material in a via disposed in the base substrate 1; at the first end 60, disconnected metal mesh lines 13 on the first surface 200 are also connected to each other through the metal material in another via disposed in the base substrate 1; as shown in FIGS. 1A and 5, on the first surface 200, the metal mesh lines 13 between two first metal mesh strips are disconnected from each other, and an orthographic projection of a position at which the metal mesh lines 13 are disconnected from each other on the base substrate 1 overlaps with an orthographic projection of one second metal strip 12 on the base substrate 1; and the first end connection line 601 connected to the first end 60 on the second surface 300 is connected to this second metal strip 12, and the second connection line 901 connected to the second end 90 is connected to another second metal strip 12.

As shown in FIGS. 1A and 5, on the second surface 300, each second metal strip 12 substantially extending along the second direction Y is provided with a gap 500. The second metal strip 12 is broken at the gap 500.

As shown in FIGS. 1A and 1B, the metal mesh lines for realizing the touch units on the touch substrate of the present disclosure are constituted by the first metal layer TM2 and the second metal layer TM1 disposed on the first surface 200 and the second surface 300 of the base substrate 1, respectively. The metal mesh lines included in the two layers are electrically connected to one another through the vias in the base substrate 1, thereby forming the touch units capable of realizing the self-capacitive touch display panel. In the foregoing description regarding FIG. 5, the plurality of second meal strips 12 formed on the second surface 300 substantially extend along the second direction Y; each second metal strip 12 is provided with a plurality of gaps 500 which divide the second metal strip 12 into a plurality of metal sections; and these metal sections are connected to one another through the metal connection structures 600, the first end connection lines 601 and the second end connection lines 901 disposed on the second surface 300, and are then electrically connected to the first metal mesh strips formed on the first surface 200 through the first ends 60 and the second ends 90, such that respective orthographic projections of the second metal strips and the first metal strips on the base substrate 1 are combined to constitute a metal mesh structure to form the plurality of touch units of the present disclosure.

In addition, FIGS. 1A and 1B further show a plurality of openings 50. As can be seen from FIG. 1A, not all metal connection lines 80 of the metal connection structures 600 include the opening 50. In the present disclosure, the openings 50 are only provided for dividing the entire metal mesh structure formed on the first surface 200 and the second surface 300 as described above so as to form a plurality of touch blocks, and accordingly, the metal connection lines 80 of the metal connection structures 600 are cut off by the openings 50 only at specific positions needed to divide the metal lines of the metal mesh structure to form the plurality of touch blocks. In other words, in the present disclosure, the metal lines of the entire metal mesh structure can be divided to form the plurality of touch blocks simply by cutting off the metal connection lines 80 of the metal connection structures 600 in the region of the touch substrate to be divided. With the arrangement of the openings 50, the gaps 500 disposed in the second metal strips 12 as well as the first metal mesh layer TM2 and the second metal mesh layer TM1 respectively disposed on the first surface 200 and the second surface 300, the mesh-shaped metal lines as a whole can be divided into a plurality of touch blocks. Therefore, the present disclosure can easily realize the division of the touch blocks. In addition, positions to divide the touch blocks are disposed on the second surface 300, that is, in the touch substrate, the openings 50 at a boundary between every two adjacent touch blocks are on the second metal mesh layer TM1, the gaps 500 in each second metal strip 12 are also on the second metal mesh layer TM1, and the base substrate 1 (e.g., film layers such as SiNx) is disposed between the first metal mesh layer TM2 and the second metal mesh layer TM1; therefore, after external light is refracted by a plurality of film layers, the reflectance of the metal in the second metal mesh layer TM1 is weakened, which can eliminate the visible mura caused by the gaps at the boundary.

As shown in FIG. 1A, in one embodiment, respective orthographic projections of two adjacent second metal strips 12 among the plurality of second metal strips 12 on the substrate base 1 overlap with an outer contour of an orthographic projection of a corresponding first metal mesh strip among the plurality of first metal mesh strips on the base substrate 1, that is, the respective orthographic projections of the two adjacent second metal strips 12 on the base substrate 1 may be deemed as the outer contour or borders enclosing the orthographic projection of the corresponding first metal mesh strip on the base substrate 1.

In addition, it is to be noted that except for the first end connection line 601 and the second end connection line 901 (respectively corresponding to metal mesh lines 6011 and 9011 formed on the first surface 200, as shown in the area enclosed by the dotted line G in FIG. 1B), respective orthographic projections, on the base substrate 1, of the metal lines included in the second metal mesh layer TM1 formed on the second surface 300 do not overlap with respective orthographic projections, on the base substrate 1, of the metal lines included in the first metal mesh layer TM2 formed on the first surface 200. In other words, in order to form the plurality of independent touch blocks as needed to realize self-capacitive touch detection, respective orthographic projections, on the base substrate 1, of the metal lines disposed on the two opposite surface of the base substrate 1 may be deemed as being complementary to one another, whereby these metal lines are combined to form the metal mesh lines of the touch blocks.

Specifically, as shown in FIG. 1A, an aggregation of the orthographic projections of the plurality of first metal mesh strips and the plurality of second metal strips 12 on the base substrate 1 may include a plurality of first metal mesh sub-strips 11, a plurality of second metal mesh sub-strips 22 and a plurality of third metal mesh sub-strips 33 to constitute a plurality of repeating units 100, each repeating units 100 includes a first metal mesh sub-strip 11, a second metal mesh sub-strip 22 and a third metal mesh sub-strip 33 arranged successively along the first direction X, and the plurality of repeating units 100 are arranged successively along the first direction X; each repeating unit 100 includes a plurality of repeating sub-units 10 arranged along the second direction Y, each repeating sub-unit 10 includes a structure of four rows and three columns constituted by four first blocks, four second blocks and four third blocks, a first row includes a first block, a second block and a third block arranged successively along the first direction X, each of second and four rows includes a second block, a third block and a first block arranged successively along the first direction X, and a third row includes a third block, a first block and a second block arranged successively along the first direction X; as shown in FIG. 1A, the first block includes a first sub-block 20 and a second sub-block 30 arranged along the first direction X and being in contact with each other, the second block includes a third sub-block 40 and a first sub-block 20 arranged along the first direction X and being in contact with each other, and the third block includes a second sub-block 30 and a third sub-block 40 arranged along the first direction X and being in contact with each other; and an orthographic projection, on the base substrate 1, of a position at which the first sub-block 20 and the second sub-block 30 contact with each other in the first block in each of the first to third row overlaps with an orthographic projection, on the base substrate 1, of a corresponding metal connection structure among the plurality of metal connection structures. As can be seen from FIG. 1A, respective orthographic projections of the plurality of metal connection structures 600 on the base substrate 1 fall within respective structures in the first to third rows, but no orthographic projection thereof falls within the structure in the fourth row.

In one embodiment, as shown in FIG. 1A, each of the first sub-block 20, the second sub-block 30 and the third sub-block 40 is a hexagon extending along the second direction Y; a length of the first sub-block 20 along the second direction Y is greater than a length of each of the second sub-block 30 and the third sub-block 40; and the first block and the second block belonging to two adjacent rows respectively are offset by one sub-block along the first direction X, the second block and the third block belonging to two adjacent rows respectively are offset by one sub-block along the first direction X, and the first block and the third block belonging to two adjacent rows respectively are offset by one sub-block along the first direction X.

As shown in FIG. 1A, the plurality of second metal strips 12 on the second surface 300, which substantially extend along the second direction Y, divide the second surface 300 into a plurality of regions; the plurality of metal connection structures 600 are disposed between every two adjacent second metal strips 12. In the embodiment shown in FIG. 1A, each repeating sub-unit 10 includes three metal connection structures 600, for example, a first metal connection structure 600-1, a second metal connection structure 600-2 and a third metal connection structure 600-3, as shown in FIG. 1A. The first end connection line 601 and the second end connection line 901 respectively connected to the first end 60 and the second end 90 of the first metal connection structure 600-1 are connected to a first connection point a1 and a second connection point a2 on two second metal strips 12 adjacent to the first metal connection structure 600-1, respectively; the first end connection line 601 and the second end connection line 901 respectively connected to the first end 60 and the second end 90 of the second metal connection structure 600-2 are connected to a first connection point b1 and a second connection point b2 on two second metal strips 12 adjacent to the second metal connection structure 600-2, respectively; and the first end connection line 601 and the second end connection line 901 respectively connected to the first end 60 and the second end 90 of the second metal connection structure 600-3 are connected to a first connection point c1 and a second connection point c2 on two second metal strips 12 adjacent to the second metal connection structure 600-3, respectively. Based on this, each second metal strip 12 includes a plurality of first connection points and a plurality of second connection points to which the first end connection lines 601 and the second end connection lines 901 are connected, respectively. Taking a second metal strip 122 in FIG. 1A for example, it substantially extends along the second direction Y; the first metal connection structure 600-1 is connected to the second metal strip 122 through the first end connection line 601, and they are connected at the first connection point a1; the second metal connection structure 600-2 is connected to the second metal connection structure 600-2 through the second end connection line 901, and they are connected at the second connection point b2; in this way, across the repeating sub-units 10 adjacent to one another along the second direction Y, the second metal strip 122 is provided with the first connection points a1 and the second connection points b2 in turn. In other words, each second metal strip 12 includes the first connection points and the second connection points arranged alternately. The above-described gap 500 is disposed between every first connection point and second connection point adjacent to each other; for example, for each metal connection structure 600, a first gap is disposed at a side of the first connection point, and a second gap is disposed at a side of the second connection point, and based on this, the plurality of independent touch blocks are formed.

Further, as can be seen from FIG. 1A, the entire touch substrate includes a plurality of repeating sub-units 10; each repeating sub-unit 10 includes a structure of four rows and three columns, in which the metal connection structures 600 are disposed in the first three rows and situated in a layer different from the metal mesh lines 13; the metal mesh lines 13 are not disposed at positions corresponding to the metal connection structures 600 on the first surface 200; as shown in FIG. 2, the first end 60 and the second end 9X) of the metal connection structure 600 on the second surface 300 connect the metal mesh lines 13 disconnected at the corresponding position through the vias in the base substrate 1.

The touch substrate of the present disclosure includes a plurality of touch units (also known as "touch blocks"), and each touch unit includes a plurality of repeating sub-units 10 arranged in a plurality of rows and columns. In order to form the touch blocks to be controlled independently, the openings 50 are formed to cut off the metal connection lines of the metal connection structures corresponding to each of the plurality of repeating sub-units 10 between every two adjacent touch blocks.

As shown in the lower part of FIG. 1A, in the embodiment, in order to form two touch blocks independent from each other, it is necessary to cut off connection lines between the two touch blocks. In the touch substrate of the present disclosure, simply by cutting off the metal connection lines 80 of the metal connection structures 600 in one repeating sub-unit 10 (that is, by forming the openings 50 in the metal connection lines 80), electrical connection between repeating sub-units 10 adjacent thereto in the first metal mesh sub-strip 11, the second metal mesh sub-strip 22 and the third metal mesh sub-strip 33 extending along the second direction Y can be cut off. In other words, in the present disclosure, the metal connection lines of the metal connection structures in the repeating sub-units 10 to be cut off may be determined according to the desired sizes of the touch blocks. As shown in FIGS. 1A to 8, in the touch substrate of the present disclosure, since the metal connection structures are on the second surface 300 of the base substrate 1, the obtained gaps at the boundary between every two touch blocks insulated from each other are also on the second metal mesh layer TM1. Since the gaps at the boundary between the two touch blocks in the touch substrate are on the second metal mesh layer TM1 and the base substrate 1 (e.g., film layers such as SiNx) is disposed between the first metal mesh layer TM2 and the second metal mesh layer TM1, after external light is refracted by a plurality of film layers, the reflectance of the metal in the second metal mesh layer TM1 is weakened, which can eliminate the visible mura caused by the gaps at the boundary.

Figure 6:
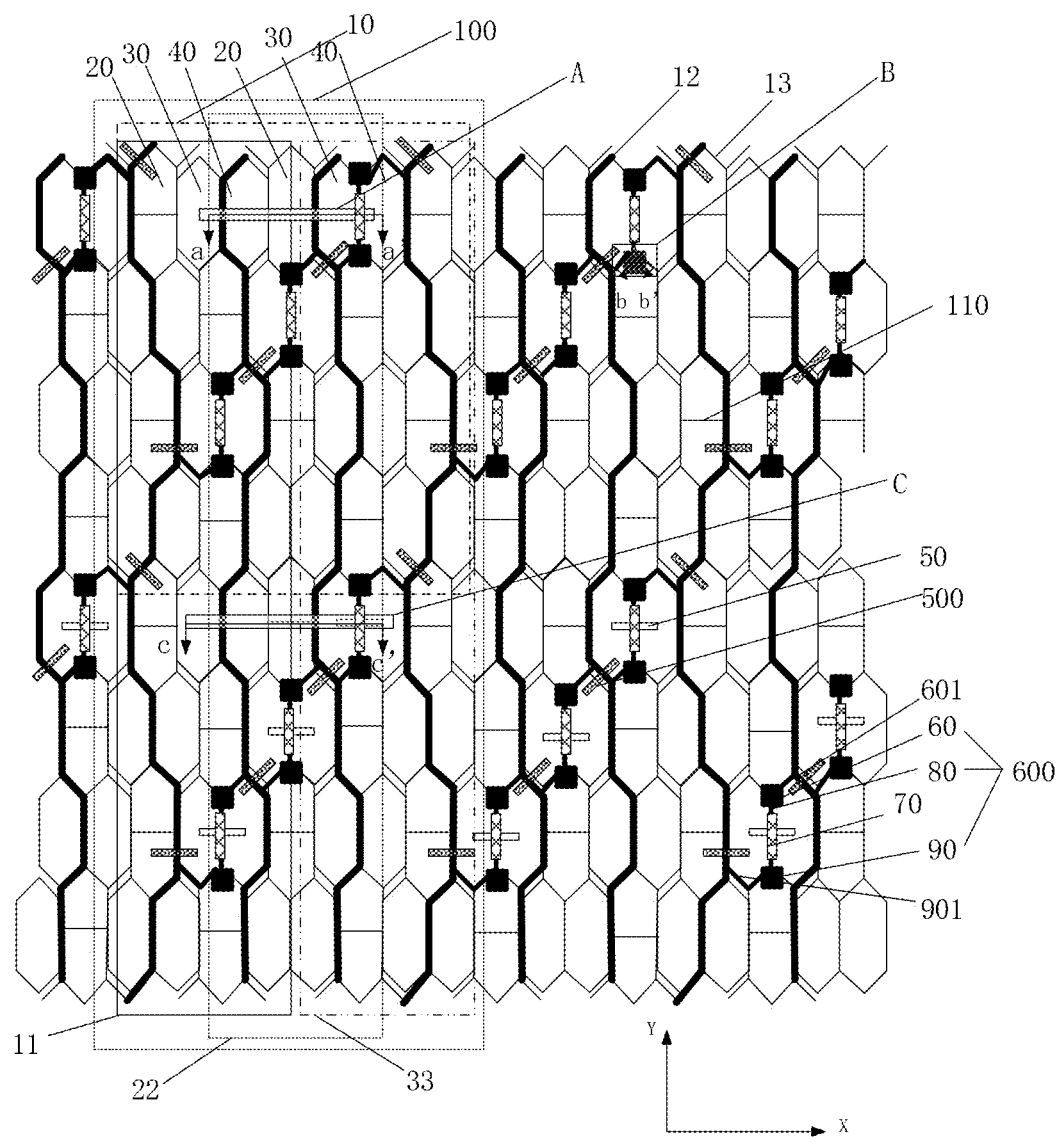
FIG. 6 shows a top view of a touch substrate according to some embodiments of the present disclosure.
Figure 7:
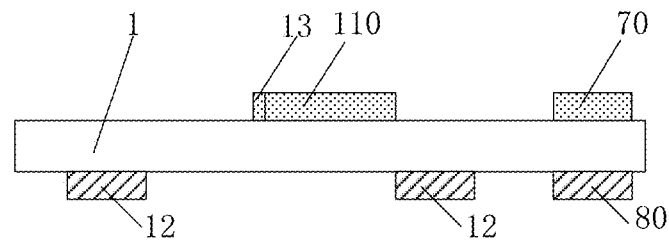
FIG. 7 shows a cross-sectional view of the touch substrate according to the embodiments shown in FIG. 6 taken along a line aa'.
Figure 8:
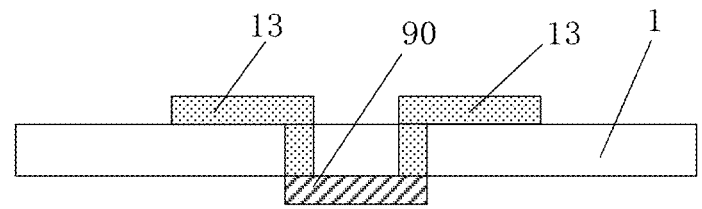
FIG. 8 shows a cross-sectional view of the touch substrate according to the embodiments shown in FIG. 6 taken along a line bb'.
Figure 9:
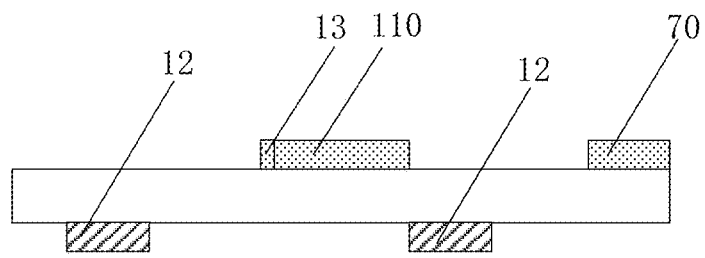
FIG. 9 shows a cross-sectional view of the touch substrate according to the embodiments shown in FIG. 6 taken along a line cc'.

In contrast to the embodiment shown in FIGS. 1A to 5, in one embodiment shown in FIGS. 6 to 9, the touch substrate further includes a redundant metal line 70 disposed at a position corresponding to the metal connection line 80 of the at least one metal connection structure 600 on the first surface 200, made of the same metal material and arranged in the same layer as the first metal mesh strip. In other words, the redundant metal line 70 may be deemed as a portion of the first metal mesh layer, and is disposed on the first surface 200 and in a floating state, that is, the redundancy metal line 70 is not electrically connected to the first metal mesh layer TM2 and the second metal mesh layer TM1. As shown in FIGS. 6 to 8, like the metal connection structure 600, the redundant metal line 70 extends along the second direction Y FIGS. 7 to 9 show cross-sectional views of the touch substrate according to the embodiment shown in FIG. 6 taken along lines aa', bb' and cc', respectively.

Like the embodiment shown in FIG. 1A, as shown in the lower part of FIG. 6, in the embodiment, in order to form two touch blocks independent from each other, it is necessary to cut off connection lines between the two touch blocks. In the touch substrate of the present disclosure, simply by cutting off the metal connection lines 80 in the metal connection structures 600 in one repeating sub-unit 10, electrical connection between repeating sub-units 10 adjacent thereto in the first metal mesh sub-strip 11, the second metal mesh sub-strip 22 and the third metal mesh sub-strip 33 extending along the second direction Y can be cut off. In other words, in the present disclosure, the metal connection lines of the metal connection structures in the repeating sub-units 10 to be cut off may be determined according to the desired sizes of the touch blocks. As shown in FIGS. 1A to 9, in the touch substrate of the present disclosure, since the metal connection structures are on the second surface 300 of the base substrate 1, the obtained gaps at the boundary between every two touch blocks insulated from each other are also on the second metal mesh layer TM1. In the embodiment shown in FIGS. 5 to 8, since the touch substrate further includes the redundant metal lines 70 disposed on the first surface 200 above the openings and at positions corresponding to the openings, after external light is refracted by a plurality of film layers, the reflectance of the metal in the first metal mesh layer TM2 is highest while the reflectance of the metal in the second metal mesh layer TM1 is relatively low, which can eliminate the visible mura caused by the gaps at the boundary.

Figure 11A:
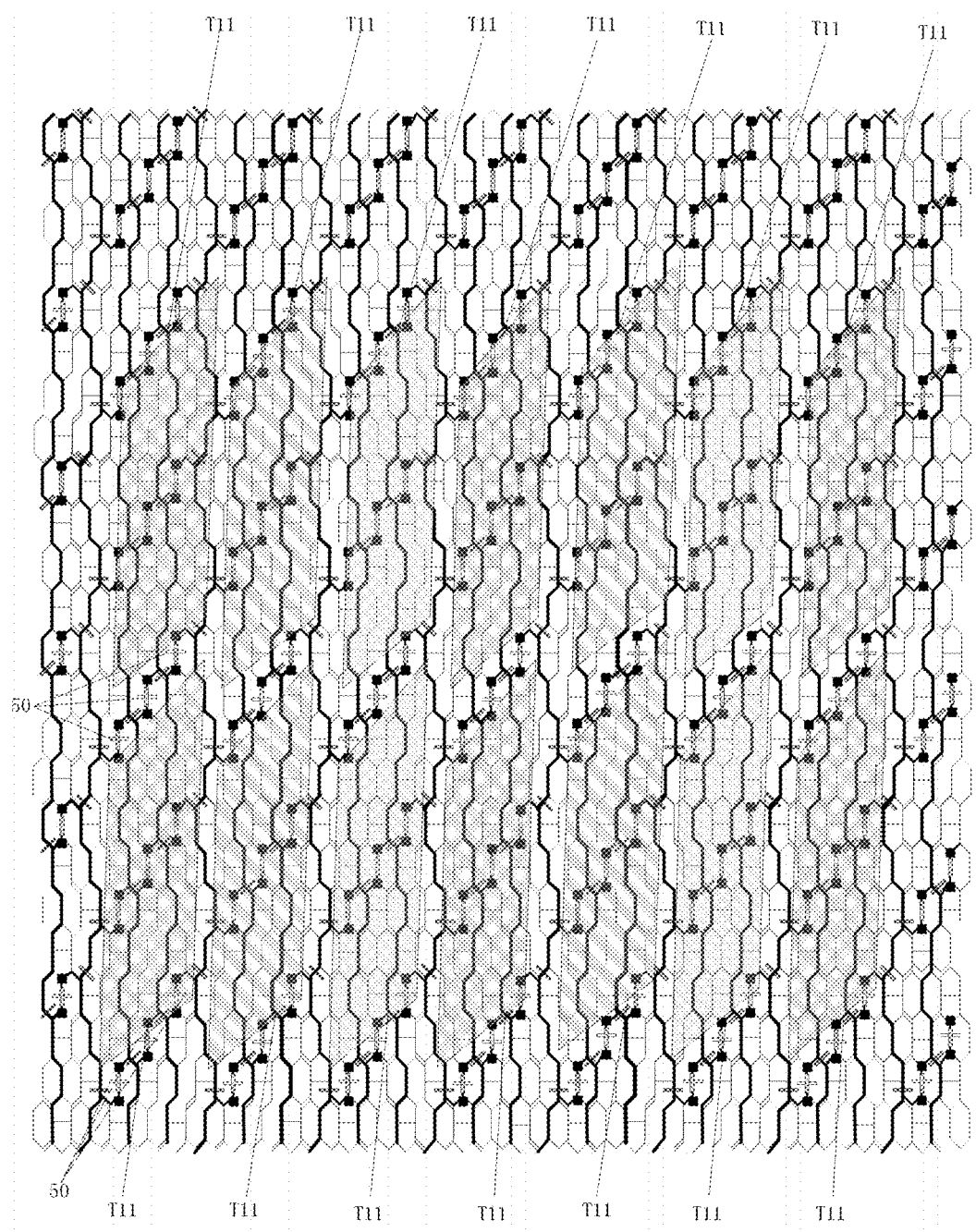
FIGS. 11A and 11B each show a schematic view of a touch substrate being divided into a plurality of touch blocks according to some embodiments to the present disclosure.
Figure 11B:
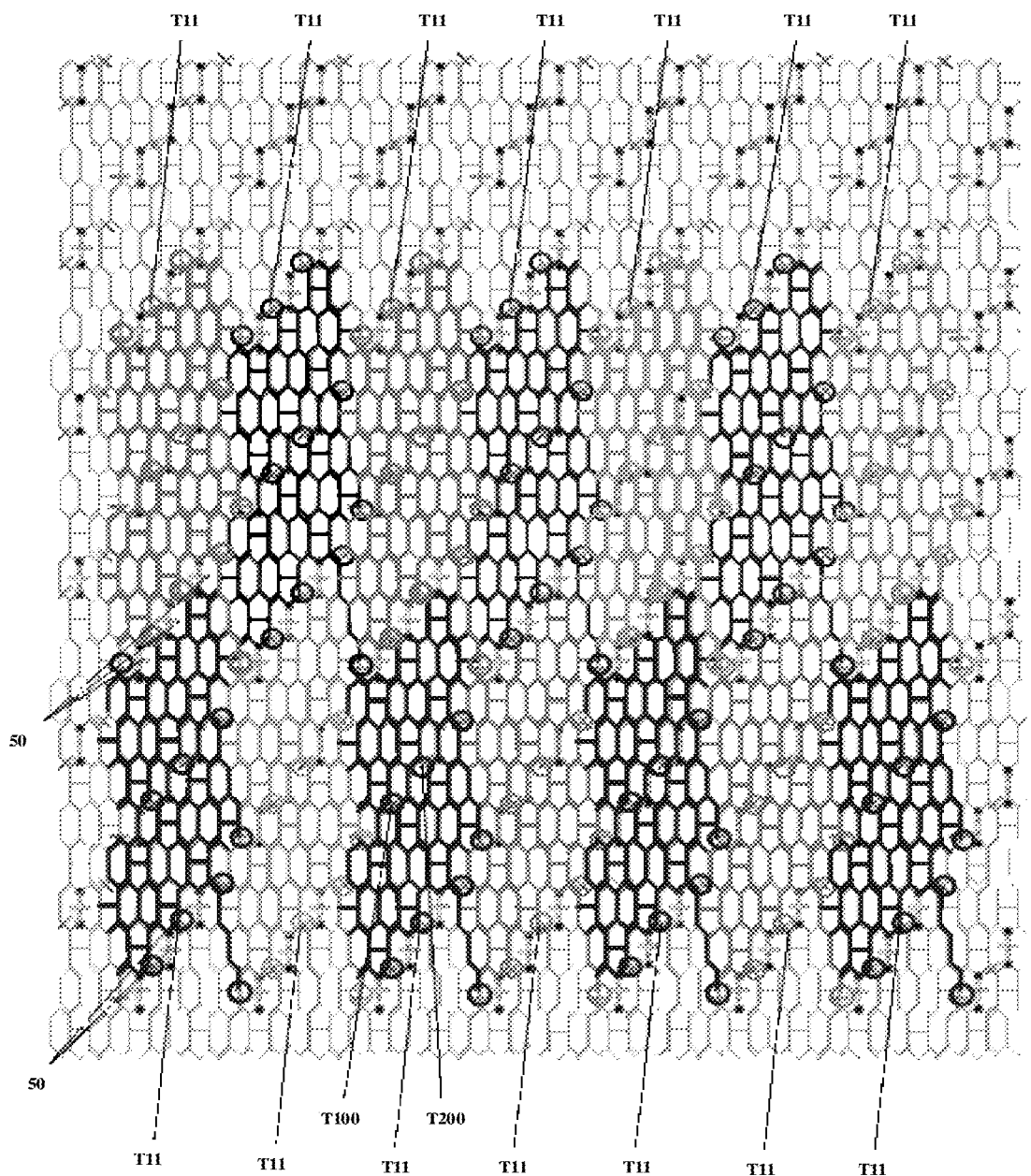

FIGS. 11A and 11B show schematic views of the touch substrate being divided into a plurality of touch blocks according to some embodiments of the present disclosure.

As shown in FIG. 11A, each repeating unit 100 extending along the second direction Y are divided into a plurality of touch blocks by the openings 50 disposed in the metal connection lines 80 of the metal connection structures 600 formed on the second surface 300. As can be seen from FIG. 11A, the metal mesh lines on the first surface 200 and the second surface 300 are combined to form the metal mesh lines included in each touch block T11. Two adjacent touch blocks T11 along the second direction Y in each repeating unit are disconnected at the openings 50. Two adjacent repeating units 100 along the first direction X are disconnected at a corresponding metal strip 12 disposed on the second surface 300. For the detailed division of the touch substrate, reference may be made to FIG. 11B. In FIG. 11B, each touch block T11 is formed by combining the metal mesh lines on the first surface 200 and the second surface 300. The metal mesh lines included in each touch block T11 shown in FIG. 11B are an aggregation of the mesh lines involved in the touch operation, and these mesh lines are disposed on the first surface 200 and the second surface 300, respectively. Referring to FIGS. 1A to 9, some touch mesh lines shown in FIG. 11A appear to be connected, but are actually disconnected. FIG. 11B only shows respective orthographic projections of the plurality of mesh lines included in each touch block T11 on the base substrate 1. In addition. FIG. 11B shows a plurality of rings, for example, T100 and T200, and these rings indicate the positions of the gaps 500 cutting off the second metal mesh strips 12 along the second direction Y on the second surface 300. It can be seen that the metal mesh lines are disconnected at these positions.

FIGS. 11A and 11B only show one method of dividing the touch substrate according to some embodiments of the present disclosure. However, the present disclosure is not limited thereto. As described above, the arrangement of the metal mesh lines on the first surface and the second surface of the touch substrate may be determined according to the arrangement of sub-pixels in the display panel to be combined with the touch substrate, and the main reason is that the orthographic projections of the metal mesh lines on the base substrate do not overlap with those of light-emitting regions of the sub-pixels on the base substrate in order to ensure the light-emitting quality of the display panel.

The present disclosure is not limited thereto, and the openings 50 in the metal connection lines 80 may be disposed in light of the touch accuracy, for example, the opening 50 may be disposed in the metal connection line 80 of each metal connection structure 600 in the second surface 300, and the area of each touch block thus formed will be smaller than that shown in FIGS. 11A and 11B. Similarly, the area of each touch block may be enlarged by disposing fewer openings 50.

Alternatively, the area of each touch block may be enlarged by controlling the area covered by the repeating unit 100 along the first direction X to enlarge the width of the touch block along the first direction X, the detailed description of which is omitted herein.

Based on the touch substrate as described above, the present disclosure further provides a touch display panel including a display substrate and the touch substrate as described above, which are aligned with each other, wherein the display substrate includes a plurality of pixel units, each of which includes a plurality of sub-pixels. In one embodiment, the plurality of pixel units are arranged in an array, respective orthographic projections of the plurality of pixel units on the base substrate 1 overlap with those of the plurality of repeating sub-units on the base substrate 1.

First sub-pixels are red sub-pixels, second sub-pixels are green sub-pixels, and third sub-pixels are blue sub-pixels. Each of the plurality of sub-pixels includes an organic light-emitting diode.

In the present disclosure, to save masks, the mesh-shaped metal lines in the touch substrate may be prepared using a mask for preparing the plurality of sub-pixels of the pixel units in the display substrate, and therefore, the mesh-shaped metal lines thus formed may correspond to the plurality of sub-pixels in the display substrate, respectively, such that after the display substrate is alighted with the touch substrate, each first sub-block 20 may correspond to a red sub-pixel, each second sub-block 30 may correspond to a green sub-pixel, and each third sub-block 30 may correspond to a blue sub-pixel. However, the present disclosure is not limited thereto. The mesh-shaped metal lines may be of other structures, provided that in the plurality of metal mesh sub-strips extending along the second direction Y in each repeating sub-unit, there are metal lines that need to be connected by the metal connection structures disposed on the second metal mesh layer TM1, and when the metal lines need to be disconnected to form independent touch blocks, the metal connection lines of the metal connection structures at specific positions on the second metal mesh layer TM1 may be cut off, such that the metal mesh sub-strips extending along the second direction Y are disconnected from the metal mesh sub-strips adjacent thereto at the specific positions.

In this embodiment, in order to disconnect two touch blocks in the touch display panel such that they are independent from each other, it is necessary to cut off connection lines between them. In the touch display panel of the present disclosure, simply by cutting off the metal connection lines 80 of the metal connection structures 600 in one repeating sub-unit 10, electrical connection between repeating sub-units 10 adjacent thereto in the first metal mesh sub-strip 11, the second metal mesh sub-strip 22 and the third metal mesh sub-strip 33 extending along the second direction Y can be cut off. In other words, in the present disclosure, the metal connection lines of the metal connection structures in the repeating sub-units 10 to be cut off may be determined according to the desired sizes of the touch blocks. As shown in FIGS. 1A to 8, in the touch substrate of the present disclosure, since the metal connection structures are on the second surface 300 of the base substrate 1, the obtained gaps at the boundary between every two touch blocks insulated from each other are also on the second metal mesh layer TM1. In the touch display panel including the touch substrate shown in FIGS. 1A to 4, the gaps at the boundary between the two touch blocks are on the second metal mesh layer TM1, and the base substrate 1 (e.g., film layers such as SiNx) is disposed between the first metal mesh layer TM2 and the second metal mesh layer TM1; therefore, after external light is refracted by a plurality of film layers, the reflectance of the metal in the second metal mesh layer TM1 is weakened, which can eliminate the visible mura caused by the gaps at the boundary. In the embodiment of the touch display panel including the touch substrate shown in FIGS. 5 to 8, since the touch substrate further includes the redundant metal lines 70 disposed on the first surface 200 above the openings and at positions corresponding to the openings, after external light is refracted by a plurality of film layers, the reflectance of the metal in the first metal mesh layer TM2 is highest while the reflectance of the metal in the second metal mesh layer TM1 is relatively low, which can eliminate the visible mura caused by the gaps at the boundary.

Figure 10A:
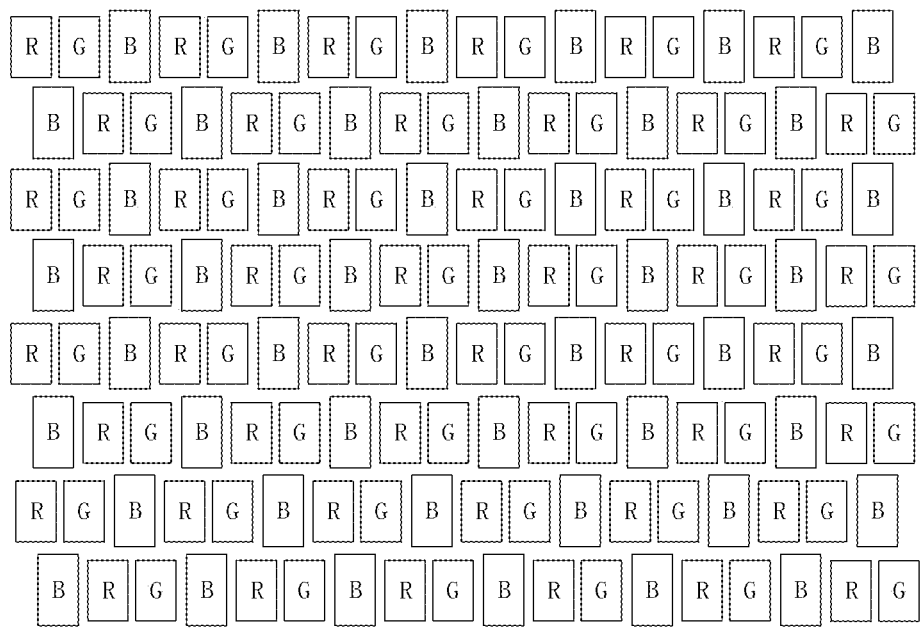
FIGS. 10A and 10B show a schematic view of arrangement of an array of sub-pixels in pixel units in a display substrate of a touch display panel according to some embodiments of the present disclosure.

As shown in FIG. 1A, the touch substrate of the present disclosure may be deemed as including the plurality of first sub-blocks 20, the plurality of second sub-blocks 30 and the plurality of third sub-blocks 40. However, the present disclosure is not limited thereto. Based on actual needs, the shapes and arrangement of the first sub-blocks, the second sub-blocks and the third sub-blocks may be configured according to the above-described concept of the present disclosure. FIGS. 1A and 1B show that the touch substrate includes a plurality of mesh cells defined by the metal lines, the actual shapes and sizes of these mesh cells are configured to match the arrangement of the sub-pixel units in the pixel units in the display substrate. For example, each pixel unit in a display substrate prepared by a conventional technique includes a red (R) sub-pixel, a green (G) sub-pixel and a blue (B) sub-pixel with colors different from one another, and the arrangement of the R, G and B sub-pixels in the pixel units includes, for example, delta arrangement (shown in FIG. 10A) and mosaic arrangement (shown in FIG. 10B). In the present disclosure, as shown in FIG. 1A, the sub-blocks in the touch substrate may correspond to the sub-pixels in the delta arrangement (shown in FIG. 10A), respectively, so as to prevent the mesh-shaped metal lines in the touch substrate from blocking the light-emitting regions of the sub-pixels and hence affecting the display effect of the display substrate. For a pixel structure of the display panel shown in FIGS. 10A and 10B, there is no need to dispose the additional metal lines 110 in the touch substrate shown in FIGS. 1A and 6, which would prevent the additional metal lines 110 from blocking the light-emitting regions of the sub-pixels and hence affecting the display effect of the display panel.

Therefore, the configuration of the mesh-shaped metal lines in the touch substrate of the present disclosure is not limited to the shape shown in FIG. 1A. For example, as shown in FIG. 10C, the mesh-shaped metal lines in the touch substrate may be arranged according to an array of sub-pixels arranged in strips in the display substrate shown in FIG. 10B.

Figure 10B:
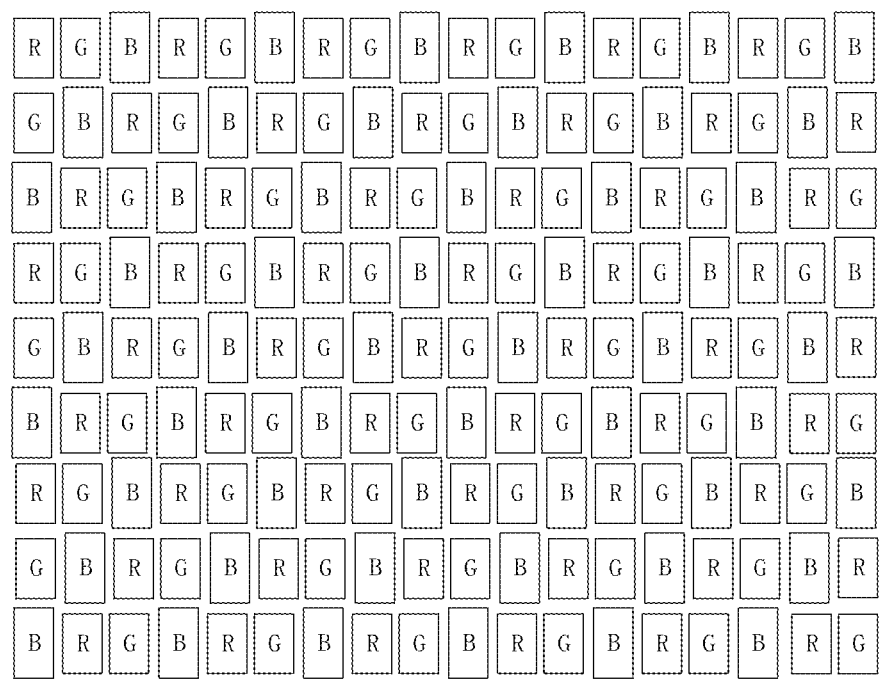
Figure 10C:
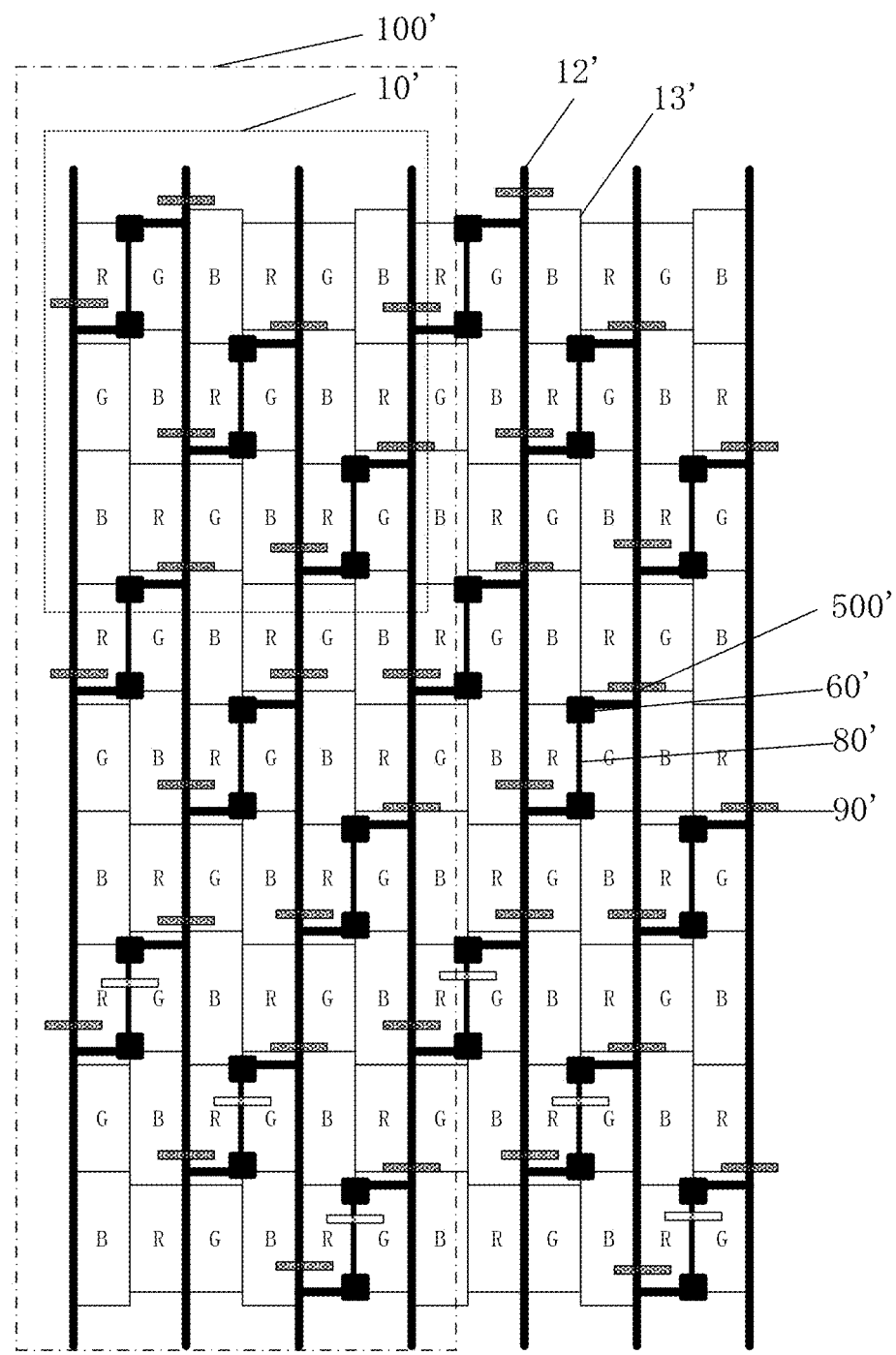
FIG. 10C shows a top view of a touch substrate according to some embodiments of the present disclosure.

Similar to FIG. 1A, FIG. 10C shows a schematic view of a structure of a touch substrate according to some embodiments of the present disclosure. In contrast to FIG. 1A, the wiring of the touch blocks in the touch substrate shown in FIG. 10C corresponds to the arrangement of the sub-pixel array in the display substrate shown in FIG. 10B, such that an orthographic projection of the wiring of the touch blocks on the base substrate substantially surrounds peripheries of the corresponding sub-pixels in the sub-pixel array, so as to prevent the wiring of the touch blocks from affecting the display of the sub-pixel array in the display substrate and hence affecting an aperture ratio of the display substrate. The touch substrate also includes the first metal mesh layer and the second metal mesh layer disposed on the first surface and the second surface of the base substrate, respectively. Similar to the metal mesh of the touch substrate shown in FIG. 1A, the combination of respective orthographic projections of the first metal mesh layer and the second metal mesh layer on the base substrate also includes a plurality of repeating units 100' arranged successively along the first direction X; and each repeating unit 100' extends along the second direction Y and includes a plurality of repeating sub-units 10'.

Similar to the wiring of the touch substrate shown in FIG. 1A, the wiring on the second surface 300 of the base substrate of the touch substrate shown in FIG. 10C also includes a plurality of second metal strips 12', every two adjacent metal strips 12' are connected to each other by a plurality of metal connection structures, each of which includes a first end 60', a second 90' and a metal connection line 80' there-between. In addition, an opening 500' is also disposed between every two adjacent connection points on each second metal strip 12'.

In contrast to the touch substrate shown in FIG. 1A, based on the arrangement of the sub-pixel array in the display substrate shown in FIG. 10B, the wiring disposed in the touch substrate as shown in FIG. 10C may be formed by straight lines respectively extending along the first direction and the second direction, instead of the second metal strips 12 which are folded lines substantially extending along the second direction and the first metal mesh strips each consisting of the trunk portions which are straight lines extending along the second direction and the branch portions which are folded lines extending along the direction at the predetermined angle to the second direction as shown in FIG. 1A.

As described above, the arrangement of the wiring of the touch blocks in the touch substrate is substantially based on the arrangement of the corresponding sub-pixel array in the display substrate; however, the present disclosure is not limited thereto, provided that the combination of the wiring on the first surface and the wiring on the second surface can realize the self-capacitive touch blocks.

In addition, as can be seen from FIGS. 1A and 10C, instead of the structure of four rows and three columns shown in FIG. 1A, each repeating sub-unit in FIG. 10C is a structure of three rows and three columns, which also depends on the arrangement of sub-pixel array of the display substrate.

Figure 10D:
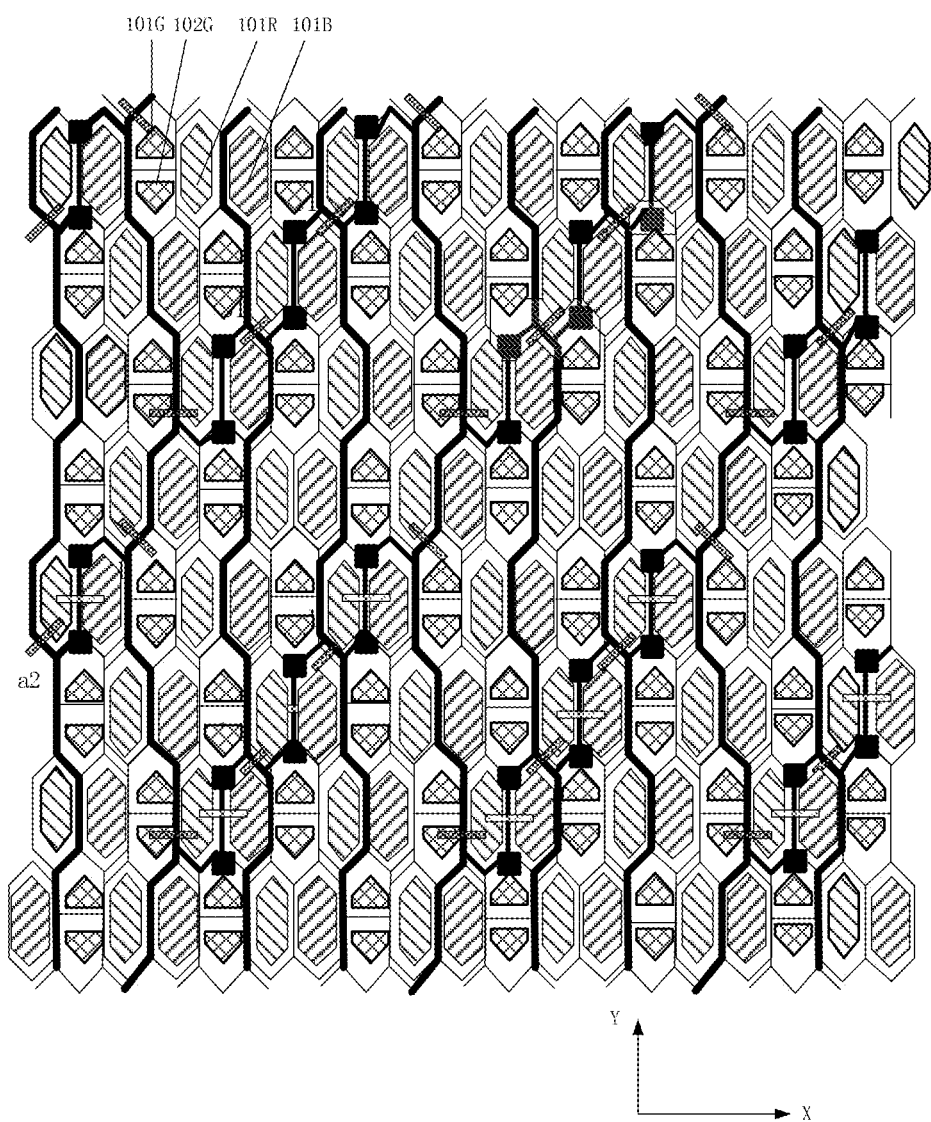
FIG. 10D shows a top view of a touch display panel according to some embodiments of the present disclosure.

The touch substrate including the additional metal lines 110 shown in FIGS. 1A, 1B and 6 is especially suitable for the display panel including GGRB pixel units, particularly, the display panel including the display substrate and the touch substrate schematically shown in FIG. 10D. Each GGRB pixel unit of the display substrate includes two green sub-pixels 101G and 102G, a red sub-pixel 101R and a blue sub-pixel 101B. An orthographic projection of each additional metal line 110 of the touch substrate is between two green sub-pixels of a corresponding pixel unit, which can increase the coverage of the touch mesh lines without blocking the light-emitting regions of the sub-pixels in the display substrate and hence affecting the display quality of the display panel. In this case, each first sub-block 20 is divided into a first portion and a second portion; for example, the first portion and the second portion thus divided may be symmetrical with respect to the corresponding additional metal line 110. An orthographic projection of the first portion on the base substrate 1 completely encompasses that of one green sub-pixel, that is, 101G, on the base substrate 1, an orthographic projection of the second portion on the base substrate 1 completely encompasses that of the other green sub-pixel, that is, 102G, on the base substrate 1, an orthographic projection of the second sub-block 30 on the base substrate 1 completely encompasses that of the red sub-pixel 101R on the base substrate 1, and an orthographic projection of the third sub-block 40 on the base substrate 1 completely encompasses that of the blue sub-pixel 101B on the base substrate 1.

As described above, the metal mesh forming the touch blocks of the self-capacitive touch substrate is jointly decided by respective wiring on the first surface and the second surface of the base substrate 1, and the openings at the boundary between every two touch blocks are on the second metal mesh layer at a side of the touch substrate distal to a display surface; therefore, after external light is refracted by a plurality of film layers, the reflectance of the metal in the second metal mesh layer is weakened, which can eliminate the visible mura caused by the gaps at the boundary.

The present disclosure has been described hereinbefore, but is not limited thereto. Modifications of the embodiments described above may be made by a person skilled in the art in light of the concept behind the present disclosure without departing from the protection scope thereof.

The invention claimed is:

1. A touch substrate, comprising:
a base substrate comprising a first surface and a second surface opposite to each other;
a first metal mesh layer disposed on the first surface of the base substrate, the first metal mesh layer comprising a plurality of first metal mesh strips arranged successively along a first direction, every two adjacent first metal mesh strips being independent from each other, each of the plurality of first metal mesh strips extending along a second direction orthogonal to the first direction, each of the plurality of first metal mesh strips comprising a plurality of metal mesh lines, the plurality of metal mesh lines comprising a plurality of trunk portions extending along the second direction and a plurality of branch portions respectively connected to the plurality of trunk portions, extending from the plurality of trunk portions along directions at predetermined angles to the second direction, and the plurality of trunk portions of the plurality of metal mesh lines of each of the plurality of first metal mesh strips being provided with at least one opening along the second direction, such that each of the plurality of first metal mesh strips comprises at least one opening along the second direction; and
a second metal mesh layer disposed on the second surface of the base substrate, the second metal mesh layer comprising a plurality of metal connection structures, each of which comprises a first end, a second end and a metal connection line between the first end and the second end,
wherein an orthographic projection of the metal connection line on the base substrate at least partially overlaps with an orthographic projection of a corresponding opening of the at least one opening on the base substrate, and the first end and the second end are electrically connected to corresponding metal mesh lines of a corresponding first metal mesh strip of the plurality of first metal mesh strips through vias in the base substrate.

2. The touch substrate according to claim 1, wherein at least one of two ends of the at least one opening of the plurality of metal mesh lines includes two adjacent branch portions disconnected from each other, and one of the first end and the second end of each of the plurality of metal connection structures connects the two adjacent branch portions disconnected from each other through one of the vias disposed in the base substrate.

3. The touch substrate according to claim 2, wherein the metal connection line of each of the plurality of metal connection structures extends along the second direction.

4. The touch substrate according to claim 3, wherein a redundant metal line is further disposed on the first surface and at a position corresponding to the metal connection line of at least one metal connection structure; and the redundant metal line is in a floating state, and is situated on a same layer and made of a same material as each of the plurality of first metal mesh strips.

5. The touch substrate according to claim 4, wherein the second metal mesh layer further comprises a plurality of second metal strips extending along the second direction; and
the plurality of second metal strips are arranged successively along the first direction.

6. The touch substrate according to claim 5, wherein respective orthographic projections of two adjacent second metal strips of the plurality of second metal strips on the base substrate overlap with an outer contour of an orthographic projection of a corresponding first metal mesh strip of the plurality of first metal mesh strips on the base substrate.

7. The touch substrate according to claim 6, wherein each of the plurality of metal connection structures further comprises a first end connection line connected to the first end and a second end connection line connected to the second end;

the first end connection line is connected to a second metal strip adjacent to the first end connection line, and an intersection between the first end connection line and this second metal strip is a first connection point on the second metal strip; the second end connection line is connected to a second metal strip adjacent to the second end connection line, and an intersection between the second end connection line and the second metal strip is a second connection point on this second metal strip; and this second metal strip further comprises a first gap disposed on a side of the first connection point and a second gap disposed on a side of the second connection point same as the side of the first connection point.

8. The touch substrate according to claim 7, wherein an aggregation of respective orthographic projections of the plurality of first metal mesh strips and the plurality of second metal strips on the base substrate comprises a plurality of first metal mesh sub-strips, a plurality of second metal mesh sub-strips and a plurality of third metal mesh sub-strips so as to constitute a plurality of repeating units, each repeating unit comprises a first metal mesh sub-strip, a second metal mesh sub-strip and a third metal mesh sub-strip, and the plurality of repeating units are arranged successively along the first direction;

each repeating unit comprises a plurality of repeating sub-units arranged along the second direction, each repeating sub-unit comprises a structure of four rows and three columns constituted by four first blocks, four second blocks and four third blocks, a first row comprises a first block, a second block and a third block arranged successively along the first direction, each of a second row and a fourth row comprises a second block, a third block and a first block arranged successively along the first direction, and a third row comprises a third block, a first block and a second block arranged successively along the first direction;

the first block comprises a first sub-block and a second sub-block arranged along the first direction and being in contact with each other, the second block comprises a third sub-block and a first sub-block arranged along the first direction and being in contact with each other, and the third block comprises a second sub-block and a third sub-block arranged along the first direction and being in contact with each other; and a position at which the first sub-block and the second sub-block of the first block in each of the first to third rows contact with each other overlaps with an orthographic protection of a corresponding metal connection structure of the plurality of metal connection structures on the base substrate.

9. The touch substrate according to claim 7, wherein an aggregation of respective orthographic projections of the plurality of first metal mesh strips and the plurality of second metal strips on the base substrate comprises a plurality of first metal mesh sub-strips, a plurality of second metal mesh sub-strips and a plurality of third metal mesh sub-strips so as to constitute a plurality of repeating units, each repeating unit comprises a first metal mesh sub-strip, a second metal mesh sub-strip and a third metal mesh sub-strip, and the plurality of repeating units are arranged successively along the first direction;

each repeating unit comprises a plurality of repeating sub-units arranged along the second direction, each repeating sub-unit comprises a structure of three rows and three columns constituted by three first blocks, three second blocks and three third blocks, a first row comprises a first block, a second block and a third block arranged successively along the first direction, a second row comprises a third block, a first block and a second block arranged successively along the first direction, and a third row comprises a second block, a third block and a first block arranged successively along the first direction;

the first block comprises a first sub-block and a second sub-block arranged along the first direction and being in contact with each other, the second block comprises a third sub-block and a first sub-block arranged along the first direction and being in contact with each other, and the third block comprises a second sub-block and a third sub-block arranged along the first direction and being in contact with each other; and a position at which the first sub-block and the second sub-block of the first block in each of the first to third rows contact with each other overlaps with an orthographic protection of a corresponding metal connection structure of the plurality of metal connection structures on the base substrate.

10. The touch substrate according to claim 9, wherein each of the first sub-block, the second sub-block and the third sub-block is a rectangle extending along the second direction;

a length of the third sub-block along the second direction is greater than a length of each of the first sub-block and the second sub-block along the second direction; and the first block and the second block belonging to two adjacent rows respectively are aligned with each other along the first direction, the second block and the third block belonging to two adjacent rows respectively are aligned with each other along the first direction, and the first block and the third block belonging to two adjacent rows respectively are aligned with each other along the first direction.

11. The touch substrate according to claim 7, wherein respective orthographic projections of the plurality of branch portions of the plurality of metal mesh lines in the first metal mesh layer on the base substrate at least partially overlap with respective orthographic projections of the first end connection line and the second end connection line on the base substrate.

12. The touch substrate according to claim 11, wherein an aggregation of respective orthographic projections of the plurality of first metal mesh strips and the plurality of second metal strips on the base substrate comprises a plurality of first metal mesh sub-strips, a plurality of second metal mesh sub-strips and a plurality of third metal mesh sub-strips so as to constitute a plurality of repeating units, each repeating unit comprises a first metal mesh sub-strip, a second metal mesh sub-strip and a third metal mesh sub-strip, and the plurality of repeating units are arranged successively along the first direction;

each repeating unit comprises a plurality of repeating sub-units arranged along the second direction, each repeating sub-unit comprises a structure of four rows and three columns constituted by four first blocks, four second blocks and four third blocks, a first row comprises a first block, a second block and a third block arranged successively along the first direction, each of a second row and a fourth row comprises a second block, a third block and a first block arranged successively along the first direction, and a third row comprises a third block, a first block and a second block arranged successively along the first direction;

the first block comprises a first sub-block and a second sub-block arranged along the first direction and being in contact with each other, the second block comprises a third sub-block and a first sub-block arranged along the first direction and being in contact with each other, and the third block comprises a second sub-block and a third sub-block arranged along the first direction and being in contact with each other; and a position at which the second sub-block and the third sub-block of the third block in each of the first to third rows contact with each other overlaps with an orthographic protection of a corresponding metal connection structure of the plurality of metal connection structures on the base substrate.

13. The touch substrate according to claim 12, wherein each of the plurality of second metal strips comprises a plurality of first connection points and a plurality of second connection points which are arranged alternately, and an opening is disposed between a first connection point and a second connection point adjacent to each other of each of the plurality of second metal strips.

14. The touch substrate according to claim 12, wherein each of the plurality of first metal mesh strips comprises, at a position of its first sub-block, an additional metal line being in contact with and connected to a metal mesh line extending along the second direction, among the plurality of metal mesh lines, and the additional metal line extends along the first direction.

15. The touch substrate according to claim 12, wherein respective orthographic projections of the plurality of metal connection structures on the base substrate fall within the first row, the second row and the third row.

16. The touch substrate according to claim 15, wherein each of the first sub-block, the second sub-block and the third sub-block is a hexagon extending along the second direction;

a length of the first sub-block along the second direction is greater than a length of each of the second sub-block and the third sub-block along the second direction; and the first block and the second block belonging to two adjacent rows respectively are offset by a predetermined distance along the first direction such that the third sub-block of the second block is between the first sub-block and the second sub-block of the first block along the first direction, the second block and the third block belonging to two adjacent rows respectively are offset by a predetermined distance along the first direction such that the second sub-block of the second block is between the third sub-block and the first sub-block of the third block along the first direction, and the first block and the third block belonging to two adjacent rows respectively are offset by a predetermined distance along the first direction such that the second sub-block of the third block is between the first sub-block and the second sub-block of the first block along the first direction.

17. A touch display panel, comprising a display substrate and the touch substrate according to claim 12.

18. The touch display panel according to claim 17, wherein the display substrate comprises a plurality of pixel units, each of which comprises a first sub-pixel, a second sub-pixel and a third sub-pixel; and an orthographic projection of the first sub-block on the base substrate encompasses an orthographic projection of the first sub-pixel on the base substrate, an orthographic projection of the second sub-block on the base substrate encompasses an orthographic projection of the second sub-pixel on the base substrate, and an orthographic projection of the third sub-block on the base substrate encompasses an orthographic projection of the third sub-pixel on the base substrate.

19. The display panel according to claim 17, wherein at a position of the first sub-block, the first metal mesh strip comprises an additional metal line being in contact with and connected to a metal mesh line extending along the second direction, among the plurality of metal mesh lines, and the additional metal line extends along the first direction and divides the first sub-block into a first portion and a second portion;

the display substrate comprises a plurality of pixel units, each of which comprises two first sub-pixels, a second sub-pixel and a third sub-pixel; and an orthographic projection of the first portion on the base substrate encompasses an orthographic projection of one of the two first sub-pixels on the base substrate, an orthographic projection of the second portion on the base substrate encompasses an orthographic projection of the other of the two first sub-pixels on the base substrate, an orthographic projection of the second sub-block on the base substrate encompasses an orthographic projection of the second sub-pixel on the base substrate, and an orthographic projection of the third sub-block on the base substrate encompasses an orthographic projection of the third sub-pixel on base substrate.

20. The touch display panel according to claim 19, wherein the first sub-pixel comprises a green sub-pixel, the second sub-pixel comprises a red sub-pixel and the third sub-pixel comprises a blue sub-pixel.

* * * * *